April 22, 1958 H. P. LUHN 2,831,634

CARD SYNCHRONIZED TIMING UNIT

Filed Dec. 30, 1954 2 Sheets-Sheet 1

INVENTOR.
HANS P. LUHN

BY P. C. Henninger

ATTORNEY

April 22, 1958 H. P. LUHN 2,831,634

CARD SYNCHRONIZED TIMING UNIT

Filed Dec. 30, 1954 2 Sheets-Sheet 2

INVENTOR.
HANS P. LUHN
BY [signature]
ATTORNEY

United States Patent Office 2,831,634

Patented Apr. 22, 1958

2,831,634

CARD SYNCHRONIZED TIMING UNIT

Hans P. Luhn, Armonk, N. Y., assignor to International Business Machines Corporation, New York, N. Y., a corporation of New York Application December 30, 1954, Serial No. 478,718

10 Claims. (Cl. 235—61.11)

This invention relates to a component for electronic data processing apparatus and more particularly to a card synchronized timing control mechanism for data processing machines wherein operations to be performed may be timed in response to the movement of a punched card through a sensing unit.

In the handling of masses of data, recent years have witnessed a widespread increase in the utilization of automatic data processing apparatus of both the mechanical and electrical types. Many such types of machines utilize intelligence stored in the form of specially located punch marks on tabulating cards as the source material. The intelligence contained on the punched cards, after sensing thereof has been effected by the passage of the cards through a sensing unit, can then be processed in many varied ways dependent upon the characteristics of the particular data processing unit. The processing of such data and particularly in the multiple processing thereof introduces problems in synchronization of the electrical signals representative of the intelligence contained on successively sensed card portions or columns with the operations to be performed on such data. This synchronization problem presents increased difficulties in high speed machine operation, which type of operation is highly desirable in and of itself.

This invention may be briefly described as a card synchronized self-timing control system for high speed machine operation, wherein the leading edge of the card, in conjunction with a photosensitive element in the form of a timing ladder, is utilized to produce a series of discrete electrical impulses representative of the positional location of the card in a sensing unit. Thus, for example, if there is any slippage and consequent slowing down of the rate of advance of a card in its passage through a sensing unit, such change of rate will be reflected in the spacing of the electrical impulses, which because of their timed relationship to the card advance can be utilized for any desired synchronization purposes.

The primary object of this invention is the provision of a card synchronized self-timing control system for punch card controlled data processing machines.

Other objects and advantages of the invention will be pointed out in the following specification and claims and will be illustrated in the accompanying drawings which disclose by way of example the principles of the invention and the presently preferred embodiments incorporating those principles.

Referring to the drawings.

Figures 1, 2, 3, 6:
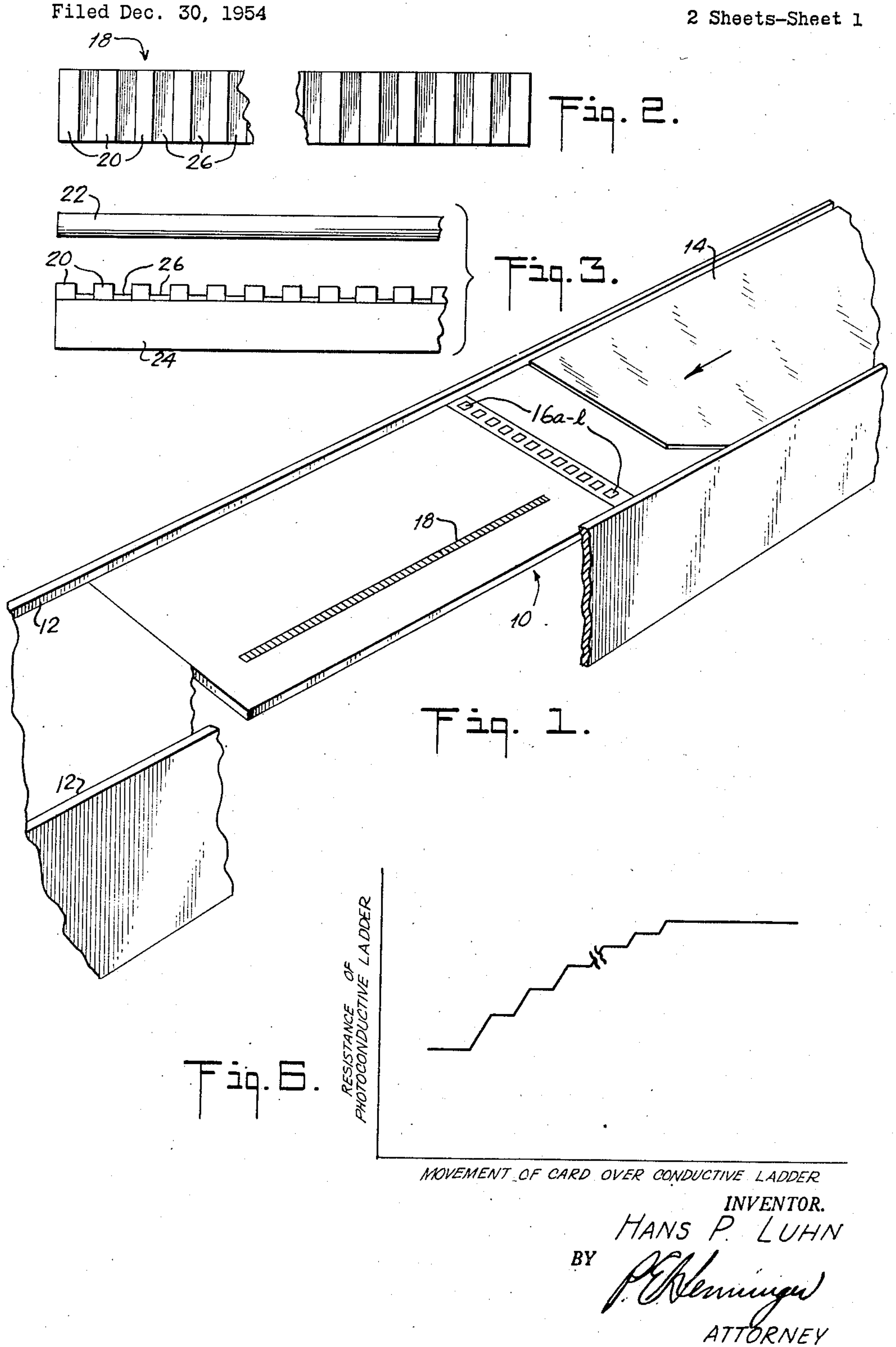
Fig. 1 is an oblique schematic representation of a card sensing mechanism accompanying a portion of the invention disclosed herein.
Fig. 2 is a plan view of a photoconductive timing ladder.
Fig. 3 is a side elevational view of the photoconductive timing ladder illustrated in Fig. 2.
Fig. 6 is a schematic graphical representation of the response characteristics of the photoconductive timing ladder.

Referring to the drawings and particularly to Fig. 1, there is illustrated a punched card sensing unit generally designated as 10 adapted to sense the punched cards as they move therethrough. Included in the sensing unit is a longitudinally disposed card track 12 of a width suitable to accommodate a punched card 14 and to prevent undue skewing thereof as it travels in the direction indicated by the arrow. Perpendicularly disposed across the path of card travel is a single column of 12 individual intelligence sensing photocells **16*a* through 16*l*, respectively, suitably located so as to sequentially sense column by column the punched designations in the 12 rows of a standard tabulating card as the card moves therepast. Disposed perpendicularly to and spaced a predetermined distance from the line of the intelligence sensing photocells 16*a* through 16*l* is a longitudinally disposed photosensitive element in the form of a timing ladder 18. Referring now also to Figs. 2 and 3, in its presently preferred form the timing ladder 18 is formed of a predetermined number of narrow spaced photoconductive strips 20 and should preferably be located in the land space between two successive rows on the card or in the land space disposed between two adjacent intelligence sensing photocells in the group 16*a* through 16*l*. Disposed above the timing ladder 18 is a suitable tubular light source 22. With respect to the construction of the timing ladder 18, there is provided a base portion 24 formed of suitable non-conductive material such as glass and having disposed on the surface thereof a plurality of spaced narrow strips 20 of photoconductive material, such as lead sulphide. The strips 20 of photoconductive material should be carefully spaced so that the spacing therebetween is representative of the distances between successive card columns on the card undergoing the sensing operation, and the number of such strips should in general at least be equal to the number of columns on the card being sensed. Disposed intermediate and connected to the strips of photoconductive material 20 are deposits of conductive material 26 which may be a suitable silver paint or other conductor so as to provide a continuity of conducting material, alternately photoconductive and purely conductive in nature from one end of the timing ladder 18** to the other.

The photoconductive material should be of the type which decreases in resistance when illuminated and increases in resistance when the illumination is removed therefrom. Lead sulphide has been found satisfactory for the purpose although other photoconductive materials of a suitable nature are well known to the art and can also be used.

As explained above, the characteristics of the photoconductive material are such that removal of illumination results in an increase in the resistance. As the strips 20 of photoconductive material are discrete in nature, it will be seen that the progressive advance of a punched card intermediate the photoconductive material and the light source 22 results in a sequential and progressive removal of illumination being received by the timing ladder 18 (and in the presently preferred embodiment by the photoconductive strips 20) and in an accompanying progressive and incremental increase, that is discrete in nature, in the resistance of the timing ladder 18 taken as a unit.

In operation of the above described unit, the cards are fed by a suitable card feed, not shown, along the card track 12 and past the intelligence sensing photocells 16*a* through 16*l* wherein the intelligence contained in the form of punch marks is transformed, column by column, into discrete electrical impulses representative thereof. If no card is being sensed, the light from the light source 22 is uninterrupted and falls upon each of the individual photoconductive strips 20 forming the timing ladder 18 and reduces the resistance of the timing ladder 18 taken as a unit to a minimum. As a punched card passes along the card track 12, the leading edge thereof will successively cut off the illumination from the individual photoconductive strips 20 forming the timing ladder 18. This removal of the illumination falling upon the photoconductive material results in a progressive and incremental increase in the resistance of the timing ladder 18, which incremental increase in resistance is discrete in nature and is representative of the position of the card passing over the timing ladder 18.

The general shape of the curve representative of the variation of resistance with respect to time is illustrated in Fig. 6. As there illustrated, when the timing ladder 18 is completely exposed to the light source, the resistance thereof is at some relatively low minimum value. As increasing numbers of photoconductive strips 20 are cut off from the light source by the passage of a card, the resistance of the timing ladder 18 increases. However, the timing ladder 18 is not a linear device so that even though the resistance thereof is increased step by step as the photoconductive strips 20 are blocked from the light strip by strip, the percentage change in resistance becomes smaller and smaller.

Figure 4:
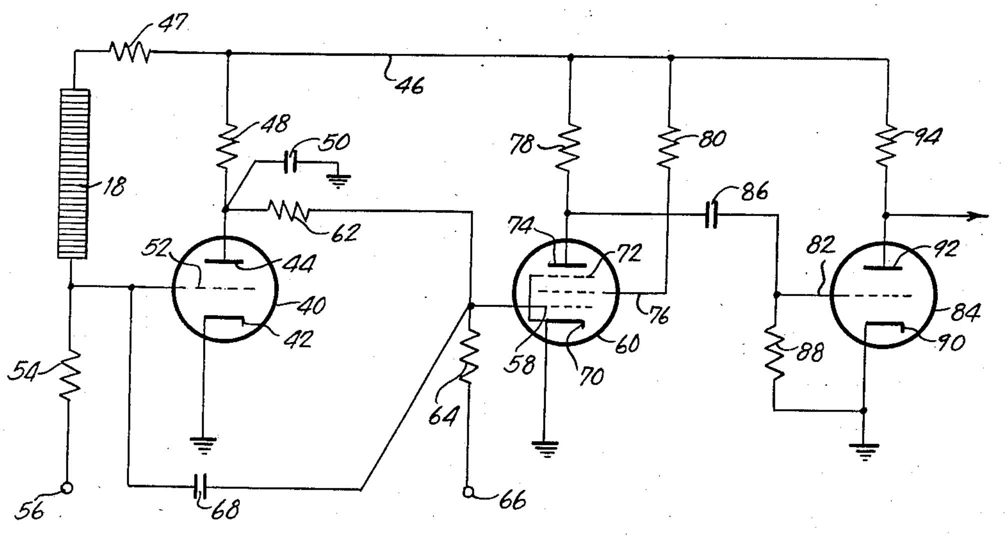
Fig. 4 is a schematic circuit diagram of a card timing circuit responsive to actuation of the timing ladder.

Turning now to Fig. 4, the timing ladder 18 is included in an electrical circuit adapted to provide a series of discrete output pulses spaced in accordance with the positional relationship of the leading edge of a card advancing over said timing ladder 18.

There is provided a first stage including a triode tube 40 having the cathode 42 thereof grounded and the plate 44 thereof connected to a suitable source of D. C. potential 46 through a plate load resistor 48 suitably bypassed to ground by a capacitor 50. The timing ladder 18 is connected between the source of potential 46 and the grid 52 of said tube 40 through a dropping resistor 47. The grid is also biased through a resistor 54 connected to a suitable source of negative D. C. potential 56.

The plate 44 of the first stage 40 is directly connected to the control grid 58 of the second stage 60 through a resistor 62. The grid 58 is also biased through resistor 64 connected to a suitable source of negative D. C. potential 66 and is connected through a capacitor 68 to the grid 52 of the first stage 40. The cathode 70 and the suppressor grid 72 of the second stage 60 are connected directly to ground. The plate 74 and the screen grid 76 are connected to the source of potential 46 through the resistors 78 and 80 respectively.

The plate 74 of the tube 60 is connected to the grid 82 of a shaping triode 84 through a coupling capacitor 86. The grid 82 is also biased from ground by a resistor 88. The cathode 90 of the third stage 84 is connected directly to ground, and plate 92 thereof is connected to the D. C. supply 46 through a resistor 94. The pulse output is taken directly from the plate 92.

In operation of the device, the resistance of the timing ladder 18 increases incrementally as illustrated in Fig. 6 as increasing numbers of the photoconductive strips 20 are cut off from the light source 22 by the passage of the leading edge of the record card therebetween. As the timing ladder 18 is not a linear device, the vacuum tube 60 and the capacitor 68 have been added to partially compensate therefor. The connection from the plate 44 of tube 40 through the resistor 62 to the grid 58 of tube 60 serves to decrease the D. C. bias level of tube 60 in discrete steps as more and more of the photoconductive strips 20 in the timing ladder 18 are blocked from the light source 22.

As a card progresses over the timing ladder 18, the resistance thereof is incrementally increased, which results in the application of an incrementally decreasing voltage to the grid 52 of the triode 40. This decrease in voltage results in incrementally stepped increasing voltage on the plate 44 thereof. This stepped increase in voltage is directly applied to the grid 58 of the second stage 60 and has the effect of increasing the grid bias thereon. The result of this circuit is to allow the second stage 60 to have a large gain when the change in resistance is small on the timing ladder 18 and to decrease the gain of the second stage 60 when the change in resistance on the plate becomes relatively large. Tube 60 is preferably a variable mu tube arranged to give more gain to smaller signals and less gain to the larger signals.

The output of the second stage 60 is a series of spaced pulses corresponding in time to the particular location of the leading edge of the card with respect to the individual photoconductive strips 20 forming the timing ladder 18. The pulse output of the second stage 60 is applied to the third stage 84 through capacitor 86, for suitable shaping and limiting thereof.

Figure 5:
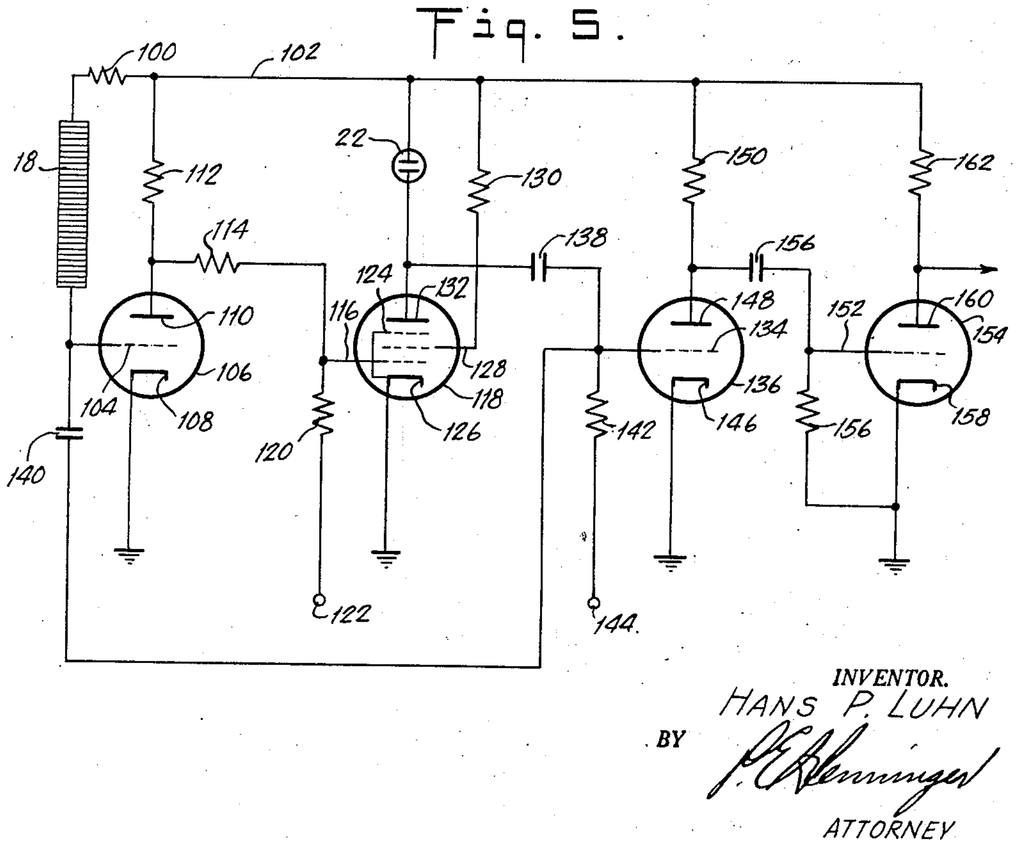
Fig. 5 is a schematic circuit diagram of an alternative card timing circuit.

Fig. 5 illustrates an alternative circuit for providing a series of discrete electrical pulses representative of the positional location of an advancing card with respect to the timing ladder 18. In this embodiment the nonlinearity of the timing ladder 18 is compensated for by varying the illumination shed thereon. Specifically, the timing ladder 18 is connected in series with a dropping resistor 100 intermediate a source of D. C. potential 102 and the grid 104 of a triode tube 106 included in a conventional amplifier circuit. The cathode 108 is grounded, and the plate 110 is connected to the D. C. source 102 through a plate load resistor 112. The output of the tube 106 is taken from the plate 110 thereof and is applied through resistor 114 to the grid 116 of a pentode tube 118. The grid 116 is also biased through a resistor 120 connected to a suitable source of negative potential 122. The suppressor grid 124 and the cathode 126 are directly connected to ground and the screen grid 128 is connected to the source 102 through a resistor 130. The plate 132 is connected to the source 102 through the light source 22.

The plate 132 is connected to the grid 134 of an amplifier triode 136 through a coupling capacitor 138. One end of the timing ladder 18 is also connected to said grid 134 through a capacitor 140, and the grid is also biased through a resistor 142 connected to a suitable source of negative potential 144. The cathode 146 of tube 136 is grounded and the plate thereof 148 is connected to the potential source 102 through a plate load resistor 150. The plate 148 of the tube 136 is connected to the grid 152 of a shaping triode 154 through a coupling capacitor 156. In the shaping circuit the grid 152 is biased through resistor 156, the cathode 158 is grounded, and the plate 160 is connected to the potential source 102 through a plate load resistor 162. The output of the shaping circuit in the form of a series of spaced pulses, corresponding in time to the particular location of the leading edge of the card with respect to the individual photoconductive strips 20 forming the timing ladder 18, is taken from the plate 160 thereof.

The above described circuit is quite similar to that illustrated in Fig. 4 and described above except that the output of the light source 22 is larger when the change of resistance is small and the output of the light source 22 is reduced when the change of resistance of the timing ladder 18 is large. In operation tube 106 serves as an amplifier whose output controls the bias on tube 118 and thereby varies the current through the light source 22.

The principles of the invention have been described and illustrated in an operative system for the purpose of teaching those skilled in the art how the invention may be performed. Changes in components thereof will appeal to those skilled in the art, and it is contemplated that such changes may be employed, but yet fall within the spirit and scope of the claims that are to follow.

Having thus described my invention, I claim:

1. A timing control mechanism for data processing apparatus wherein intelligence contained upon a moving record is sensed by a sensing mechanism comprising, means disposed in predetermined positional relationship with the sensing mechanism for providing a signal having a characteristic varying in a given sense by incremental steps each indicative of a predetermined discrete position of a record being sensed, and means associated with said first mentioned means and responsive to each step variation of said signal for providing a series of discrete electrical synchronizing impulses representative of the position of the record being sensed.

2. A timing control mechanism for a processing apparatus operative to process intelligence data contained upon a moving record comprising, a stationary data sensing mechanism, and a stationary signal generating element elongated in the direction of record movement and disposed in predetermined positional relationship with said sensing mechanism to provide in cooperation with a moving record a signal indicative of the position of said record being sensed with relation to the position of said sensing mechanism.

3. A timing control mechanism for a processing apparatus operative to process intelligence data contained upon a moving record comprising, a stationary data sensing mechanism, and a stationary elongated light responsive means disposed in predetermined positional relationship with the sensing mechanism to provide in cooperation with an opaque moving record a signal indicative of the position of said record being sensed with relation to the position of said sensing mechanism.

4. The invention as set forth in claim 3 wherein said light responsive means is a timing ladder composed of a plurality of strips of photoconductive material.

5. The invention as set forth in claim 3 wherein the signal provided by the light responsive means is representative of incremental stepped values of the resistance thereof.

6. A card synchronized timing control mechanism for a processing apparatus operative to process intelligence data contained upon an opaque moving record card comprising, a stationary data sensing mechanism, an elongated light source, and an elongated light responsive means disposed to receive light from said source and in predetermined positional relationship with the sensing mechanism and responsive to the position of the leading edge of the record card being sensed for providing a signal representative of the position of the portion of the moving record card being sensed by the sensing mechanism.

7. A card synchronized timing control mechanism for data processing apparatus wherein intelligence contained upon a moving record card is sensed by a sensing mechanism comprising means disposed in predetermined positional relationship with the sensing mechanism and responsive to the position of the leading edge of the record card being sensed for providing a signal representative of the position of the portion of the moving record card being sensed by the sensing mechanism, and means responsive to said signal for converting the same to discrete electrical impulses for synchronizing associated processing apparatus.

8. A timing control mechanism for data processing apparatus wherein intelligence contained upon a moving record is sensed by a sensing mechanism comprising means disposed in predetermined positional relationship with the sensing mechanism for providing a non-linear signal representative of the position of the portion of the record being sensed, and non-linear electrical circuit means associated with said first mentioned means and responsive to said non-linear signal for providing a series of uniform amplitude spaced electrical pulses representative of the position of the record being sensed.

9. The timing control mechanism as set forth in claim 8 wherein said first mentioned means is a light responsive unit.

10. A card synchronized timing control mechanism for a data processing apparatus operative to process intelligence data successively recorded in an opaque card comprising, a stationary data sensing means, an elongated light source, an elongated timing ladder including successive light responsive elements spaced in correspondence to the successive recording of data in said card and positioned to receive light from said source and in a predetermined positional relationship with said sensing means, and means for energizing said timing ladder to derive a potential of incremental stepped wave form of which each step thereof corresponds to the position of the leading edge of the record card being sensed with relation to said sensing means.

References Cited in the file of this patent

UNITED STATES PATENTS 2,575,034 Tyler et al. ............ Nov. 13, 1951